US012666162B2

(12) United States Patent
Yoo et al.

(10) Patent No.: US 12,666,162 B2
(45) Date of Patent: Jun. 23, 2026

(54) METHOD AND PROCESSOR FOR IMAGE DATA PROCESSING UTILIZING FULL PIXEL INFORMATION OF SAME COLOR

(71) Applicant: SAMSUNG ELECTRONICS CO., LTD., Suwon-si (KR)

(72) Inventors: Sunyoung Yoo, Suwon-si (KR); Jeyeon Kim, Suwon-si (KR); Seongwook Song, Suwon-si (KR); Gyeongsung You, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 333 days.

(21) Appl. No.: 18/143,715

(22) Filed: May 5, 2023

(65) Prior Publication Data

US 2023/0370731 A1     Nov. 16, 2023

(30) Foreign Application Priority Data

May 16, 2022    (KR) ........................ 10-2022-0059631

(51) Int. Cl.
| | |
|---|---|
| *H04N 23/84* | (2023.01) |
| *G06T 3/4015* | (2024.01) |
| *H04N 25/11* | (2023.01) |
| *H04N 25/13* | (2023.01) |
| *H04N 25/46* | (2023.01) |

(52) U.S. Cl.
CPC ........... *H04N 23/84* (2023.01); *G06T 3/4015* (2013.01); *H04N 23/843* (2023.01); *H04N 25/11* (2023.01); *H04N 25/134* (2023.01); *H04N 25/46* (2023.01)

(58) Field of Classification Search
CPC ........ H04N 23/84; H04N 25/11; H04N 25/46; H04N 23/843; H04N 25/134; G06T 3/4015; G06T 1/20
See application file for complete search history.

(56) References Cited

U.S. PATENT DOCUMENTS

| | | | |
|---|---|---|---|
| 6,614,483 | B1 | 9/2003 | Lee et al. |
| 8,213,738 | B2 | 7/2012 | Kwon et al. |

(Continued)

FOREIGN PATENT DOCUMENTS

| | | |
|---|---|---|
| JP | 2019-161577 | 9/2019 |
| KR | 10-0617651 | 8/2006 |

(Continued)

OTHER PUBLICATIONS

First Office Action issued Apr. 30, 2026 in corresponding Korean Patent Application No. 10-2022-0059631.

*Primary Examiner* — Sumati Lefkowitz
*Assistant Examiner* — Ryan P Potts
(74) *Attorney, Agent, or Firm* — Morgan, Lewis & Bockius LLP

(57) ABSTRACT

A method of processing image data includes: receiving image data from a color filter array including N×N same color pixels; converting first pixel data in an N×N array into second pixel data in an (N–L)×(N–M) array, wherein the first pixel data is output from the N×N same color pixels; and generating third pixel data in the N×N array by performing reconstruction on the second pixel data, wherein each of "L" and "M" is a natural number that is greater than or equal to 1 and less than N, and "N" is a natural number that is greater than or equal to 2.

20 Claims, 23 Drawing Sheets

(56) References Cited

U.S. PATENT DOCUMENTS

| | | | | |
|---|---|---|---|---|
| 9,137,452 | B2 * | 9/2015 | Han | H04N 23/741 |
| 9,779,476 | B2 | 10/2017 | Hsu et al. | |
| 9,826,174 | B2 | 11/2017 | Choi | |
| 10,297,629 | B2 * | 5/2019 | Lenchenkov | H10F 39/199 |
| 2020/0280659 | A1 * | 9/2020 | Galor Gluskin | H04N 23/55 |
| 2020/0280704 | A1 * | 9/2020 | Galor Gluskin | G06T 7/50 |
| 2020/0322549 | A1 * | 10/2020 | Lin | H04N 25/704 |
| 2021/0136391 | A1 | 5/2021 | Lee et al. | |
| 2021/0185286 | A1 * | 6/2021 | Pang | H04N 25/135 |
| 2021/0337240 | A1 | 10/2021 | Lee et al. | |
| 2021/0377497 | A1 * | 12/2021 | Bernstein | H04N 25/447 |
| 2021/0385395 | A1 | 12/2021 | Cha et al. | |
| 2021/0409623 | A1 * | 12/2021 | Jang | H04N 25/46 |

FOREIGN PATENT DOCUMENTS

| | | |
|---|---|---|
| KR | 10-0872253 | 11/2008 |
| KR | 10-2021-0148822 A | 12/2021 |

* cited by examiner

PX_ARRAY

3x3 SUB-PIXELS

SP4

SP5

SP0

SP1

:G

:R

:B

4x4 SUB-PIXELS

● : NODE

● : NODE

● : NODE

● : NODE

● : NODE

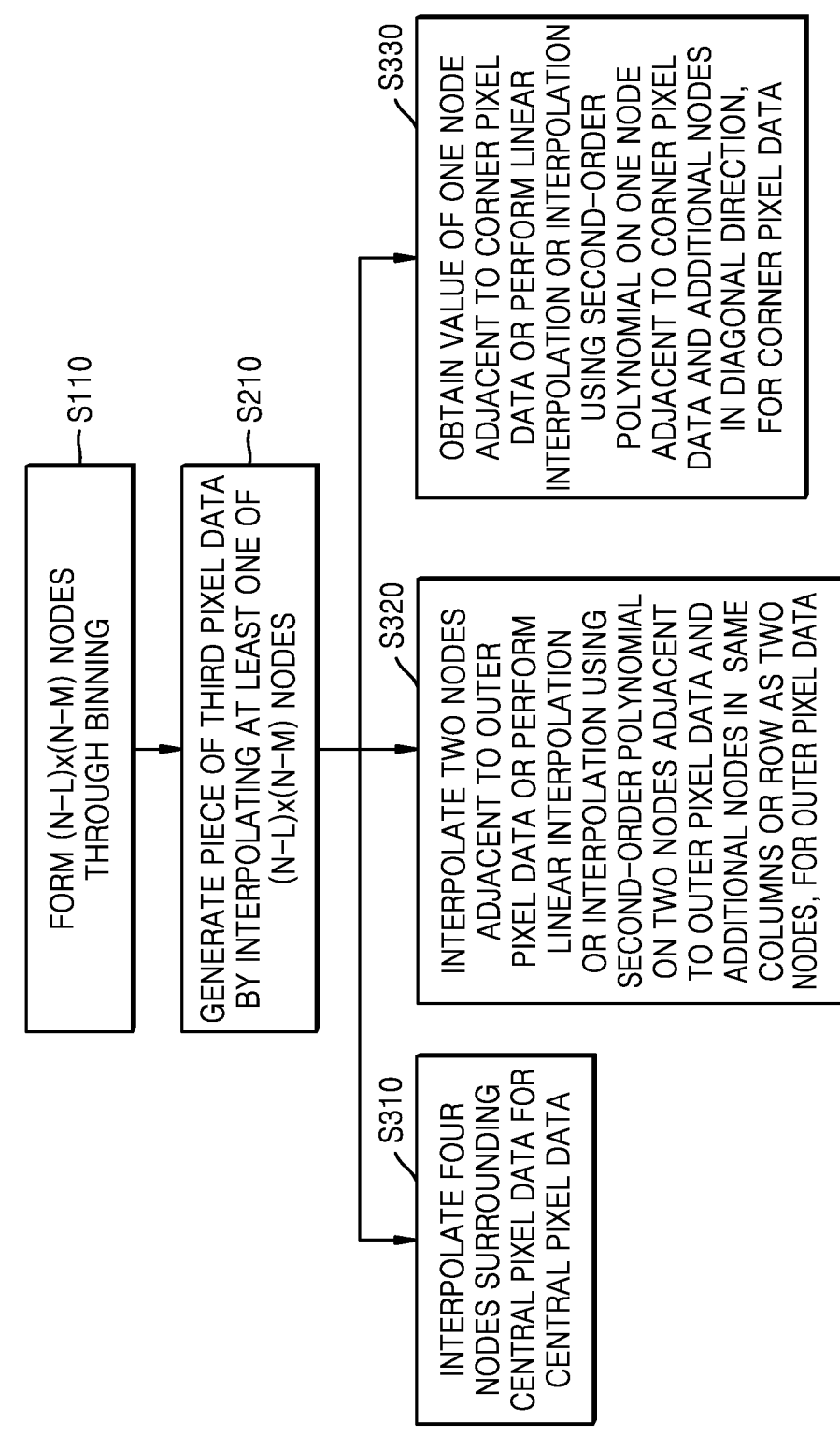

S110 — FORM (N–L)x(N–M) NODES THROUGH BINNING

S210 — GENERATE PIECE OF THIRD PIXEL DATA BY INTERPOLATING AT LEAST ONE OF (N–L)x(N–M) NODES

S310 — INTERPOLATE FOUR NODES SURROUNDING CENTRAL PIXEL DATA FOR CENTRAL PIXEL DATA

S320 — INTERPOLATE TWO NODES ADJACENT TO OUTER PIXEL DATA OR PERFORM LINEAR INTERPOLATION OR INTERPOLATION USING SECOND-ORDER POLYNOMIAL ON TWO NODES ADJACENT TO OUTER PIXEL DATA AND ADDITIONAL NODES IN SAME COLUMNS OR ROW AS TWO NODES, FOR OUTER PIXEL DATA

S330 — OBTAIN VALUE OF ONE NODE ADJACENT TO CORNER PIXEL DATA OR PERFORM LINEAR INTERPOLATION OR INTERPOLATION USING SECOND-ORDER POLYNOMIAL ON ONE NODE ADJACENT TO CORNER PIXEL DATA AND ADDITIONAL NODES IN DIAGONAL DIRECTION, FOR CORNER PIXEL DATA

METHOD AND PROCESSOR FOR IMAGE DATA PROCESSING UTILIZING FULL PIXEL INFORMATION OF SAME COLOR

CROSS-REFERENCE TO RELATED APPLICATION

This application claims priority under 35 U.S.C. § 119 to Korean Patent Application No. 10-2022-0059631, filed on May 16, 2022, in the Korean Intellectual Property Office, the disclosure of which is incorporated by reference herein in its entirety.

TECHNICAL FIELD

The present inventive concept relates to an image data processing method and an image processing processor.

DISCUSSION OF THE RELATED ART

Generally, a color filter including red, green, or blue may be above an image sensor for the color reproduction of an image, and may be arranged in the form of an array. The array of color filters may be referred to as a color filter array (CFA). In addition, a single microlens may be disposed above a CFA such that the microlens is across several pixels of the same color filter.

SUMMARY

The present inventive concept provides an image data processing method, which is applicable regardless of the cause of a phase artifact and by which a loss of resolution is reduced by making full use of pixel information of the same color.

According to an aspect of the present inventive concept, there is provided a method of processing image data output from a color filter array including N×N same color pixels.

According to an embodiment of the present inventive concept, a method of processing image data includes: receiving image data from a color filter array including N×N same color pixels; converting first pixel data in an N×N array into second pixel data in an (N–L)×(N–M) array, wherein the first pixel data is output from the N×N same color pixels; and generating third pixel data in the N×N array by performing reconstruction on the second pixel data, wherein each of "L" and "M" is a natural number that is greater than or equal to 1 and less than N, and "N" is a natural number that is greater than or equal to 2.

According to an embodiment of the present inventive concept, a method of processing image data includes: receiving image data output from a color filter array (CFA) including a plurality of CFA blocks including at least one color region including pixels of a same color; generating second pixel data by converting first pixel data output from the at least one color region; and generating third pixel data by performing reconstruction on the second pixel data, wherein the generating of the second pixel data includes forming a plurality of nodes including information about pixels included in the first pixel data.

According to an embodiment of the present inventive concept, an image processing processor processing image data output from an image sensor includes: a first processing circuit configured to perform conversion of the image data received from the image sensor; and a second processing circuit configured to perform reconstruction on converted data, wherein the first processing circuit is configured to perform the conversion by binning the image data including pixel data in an N×N array into pixel data in an (N–L)×(N–M) array, where each of "L" and "M" is a natural number that is greater than or equal to 1 and less than "N", "N" is a natural number that is greater than or equal to 2, and the second processing circuit is configured to perform the reconstruction by interpolating nodes corresponding to the pixel data in the (N–L)×(N–M) array.

BRIEF DESCRIPTION OF THE DRAWINGS

The above and other aspects of the presentative concept will become more apparent by describing in detail embodiments thereof, with reference to the accompanying drawings, in which:

FIGS. 8, 9, and 10 are diagrams for describing reconstruction methods according to an embodiment of the present inventive concept; and FIGS. 11A and 11B are flowcharts of an image data processing method according to an embodiment of the present inventive concept.

DETAILED DESCRIPTION OF THE EMBODIMENTS

Hereinafter, various embodiments of the present inventive concept are described with reference to the accompanying drawings.

Figure 1A:
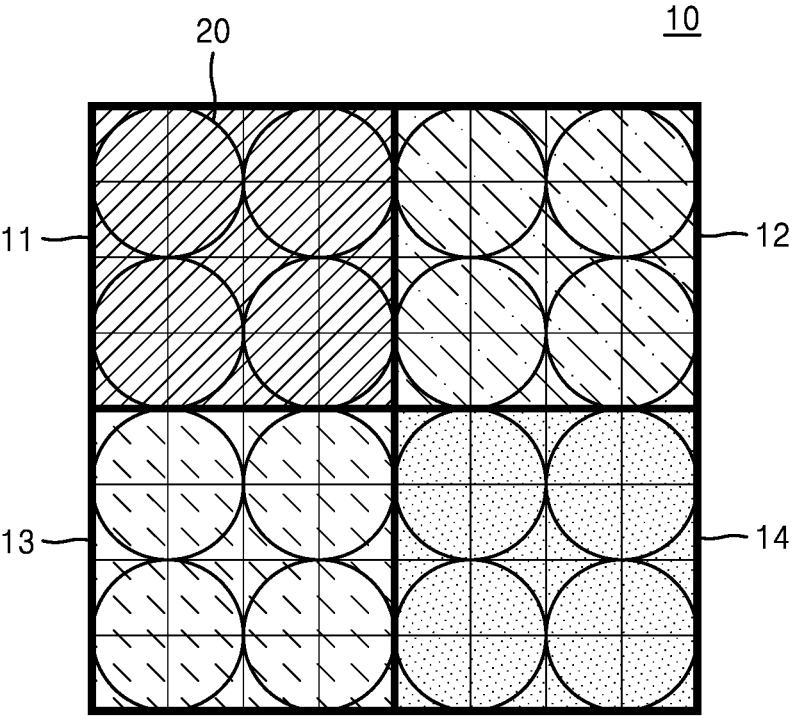
FIG. 1A illustrates an example of a color filter according to an embodiment of the present inventive concept.
Figure 1B:
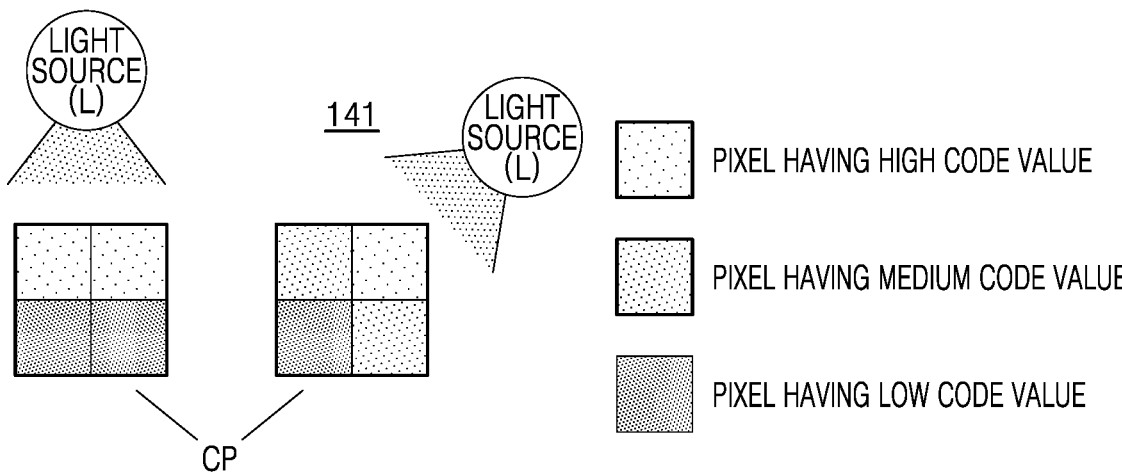
FIG. 1B is a diagram illustrating the brightness when a light source illuminates the color filter of FIG. 1A according to an embodiment of the present inventive concept.

FIG. 1A illustrates an example of a color filter according to an embodiment of the present inventive concept. FIG. 1B is a diagram illustrating the brightness when a light source illuminates the color filter of FIG. 1A according to an embodiment of the present inventive concept.

Referring to FIG. 1A, a color filter 10 of a Bayer pattern including color pixels in a 4×4 array is provided. Each of first to fourth color pixels 11, 12, 13, and 14 in the 4×4 array may include pixels having the same color. Referring to FIG. 1A, a plurality of microlenses 20 may be respectively disposed on the first to fourth color pixels 11, 12, 13, and 14 in the 4×4 array. Referring to FIG. 1A, four microlenses 20 may be disposed on the first color pixels 11. Referring to FIG. 1A, four microlenses 20 may be respectively disposed on the second color pixels 12, four microlenses 20 may be respectively disposed on the third color pixels 13, and four microlenses 20 may be respectively disposed on the fourth color pixels 14. Each of the microlenses 20 may have a size corresponding to 2×2 array color pixels.

FIG. 1B illustrates an example, in which there is a difference in a pixel value of the same color in a cell, in which 2×2 pixels share a single microlens with one another, according to a light illumination direction. Light from a light source L may pass through a microlens 20 and a color pixel CP, and image data 141 may be generated. Referring to FIG. 1B, it may be seen that there is a difference in the brightness of one color pixel CP according to the position of the light source L.

In the case of an image sensor including a microlens, the path of light incident to the microlens may vary with the position of a light source L, based on the optical character-istics of the image sensor. In other words, in the case of an image sensor including a microlens 20, an intra-channel difference may occur according to a phase in the same color channel because of various causes, such as a structure issue, a limit in processes, a position or intensity of a light source, and focus behavior.

Figure 2:
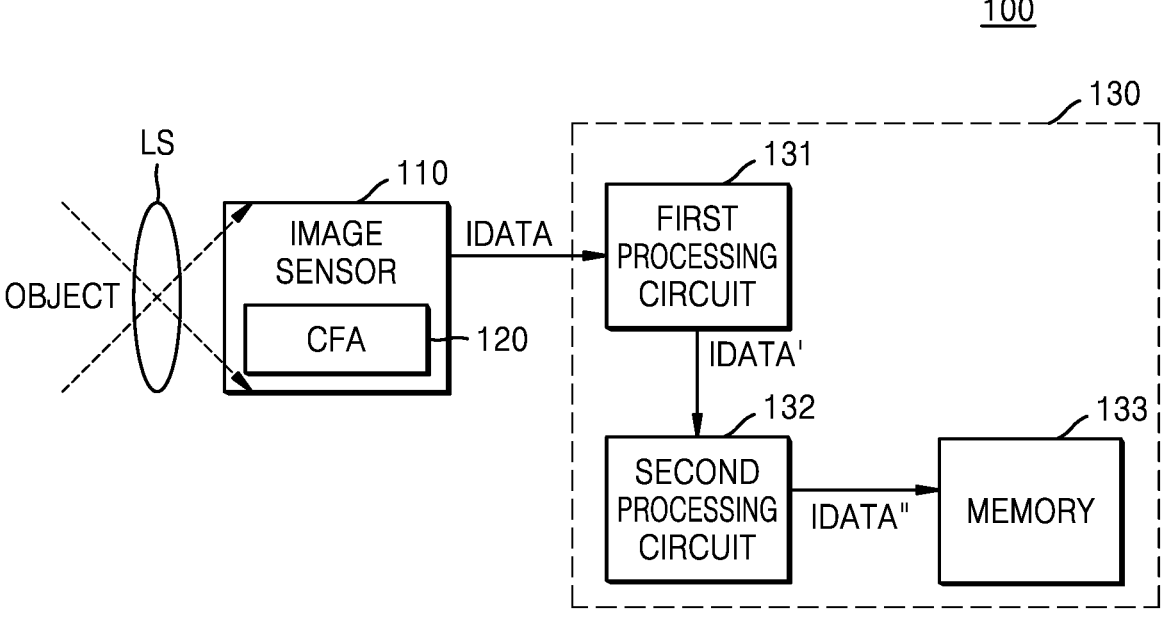
FIG. 2 is a block diagram of an image processing device according to an embodiment of the present inventive concept.

FIG. 2 is a block diagram of an image processing device according to an embodiment of the present inventive con-cept.

An image processing device 100 may include an elec-tronic device that captures and displays an image or per-forms an operation based on a captured image. For example, the image processing device 100 may include a personal computer (PC), an Internet of things (IoT) device, or a portable electronic device. The portable electronic device may include, for example, a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, or a wearable device. The image processing device 100 may be mounted on an electronic device, such as a drone or an advanced drivers assistance system (ADAS), or on an elec-tronic device provided as a component of a vehicle, furni-ture, a manufacturing facility, a door, or various kinds of measuring equipment.

Referring to FIG. 2, the image processing device 100 may include an image sensor 110 and an image processing processor 130. The image processing device 100 may further include other elements, such as a display and a user inter-face.

The image sensor 110 may include a pixel array, which includes a plurality of pixels arranged in two dimensions, and a readout circuit. The pixel array may receive and convert optical signals into electrical signals. For example, the pixel array may include a photoelectric conversion element, such as a charge-coupled device (CCD) or a complementary metal-oxide semiconductor (CMOS) con-version element, or other various kinds of photoelectric conversion elements. The readout circuit may generate raw data, based on an electrical signal from a pixel array, and may output the raw data, which has undergone noise removal or the like, as first image data IDATA. The image sensor 110 may be implemented in a semiconductor chip or a package, which includes the pixel array and the readout circuit.

According to an embodiment of the present inventive concept, the image sensor 110 may include a pixel array, and a color filter array (CFA) 120 may be disposed on the pixel array such that a certain color component is sensed by each pixel. The image sensor 110 may include the CFA 120 having a certain pattern, and may convert an optical signal of an object incident through an optical lens LS into an electrical signal using the CFA 120. In addition, the image sensor 110 may generate and output the first image data IDATA based on the electrical signal. The optical lens LS may include a microlens. There may be a plurality of optical lenses LS. Although it is illustrated in FIG. 2 that the optical lens LS is separate from the image sensor 110, the optical lens LS may be included in the image sensor 110.

In the description of embodiments below, the terms "color filter", "color pixel", "filter array", and "pixel array" may be variously defined. For example, a CFA may be defined as a separate element, which is disposed on a pixel array includ-ing a photosensitive device, or as being included in a pixel array. A color pixel may be defined as including a color filter corresponding thereto. A CFA cell and a CFA block may each be defined as including the color pixel described above.

The CFA 120 may include a plurality of CFA blocks repeatedly arranged in horizontal and vertical directions. Each CFA block may include color pixels having a certain size. According to an embodiment of the present inventive concept, the CFA blocks may be arranged in a pattern. According to an embodiment of the present inventive con-cept, the CFA blocks may be arranged in a Bayer pattern. According to an embodiment of the present inventive con-cept, the CFA blocks may be arranged in various patterns, such as a tetra pattern in which a single color unit has a size of 2×2, a nona pattern in which a single color unit has a size of 3×3, and a hexadeca pattern in which a single color unit has a size of 4×4. For convenience of description, it is assumed that the CFA blocks of the CFA 120 are arranged in a Bayer pattern. However, the present inventive concept is not limited thereto.

The image processing processor 130 may include a first processing circuit 131, a second processing circuit 132, and a memory 133. The first processing circuit 131 and the second processing circuit 132 may be implemented in one or more semiconductor chips. For example, the image process-ing processor 130 or the image processing device 100 may be implemented in a system-on-chip (SoC).

The image processing processor 130 may convert the format of the first image data IDATA received from the image sensor 110 by performing a processing operation including remosaicing and demosaicing on the first image data IDATA.

The first processing circuit 131 of the image processing processor 130 may perform conversion on the first image data IDATA. The first processing circuit 131 may perform conversion on the first image data IDATA by binning the first image data IDATA including N×N pixel data into (N−L)× (N−M) pixel data. At this time, L and M may each be a natural number that is greater than or equal to 1 and less than N. N may be a natural number that is greater than or equal to 2. The conversion method performed by the first process-ing circuit 131 is described in detail with reference to FIGS. 5A to 6E below.

The second processing circuit 132 of the image process-ing processor 130 may perform reconstruction on image data IDATA' resulting from the conversion by the first processing circuit 131. The second processing circuit 132 may perform reconstruction of data by interpolating a node corresponding to each piece of (N−L)×(N−M) pixel data. According to an embodiment of the present inventive concept, to reconstruct pixel data surrounded by four nodes among the nodes respectively corresponding to the pieces of (N–L)×(N–M) pixel data, the second processing circuit 132 may perform interpolation from an average value of the four nodes. According to an embodiment of the present inventive concept, to reconstruct the data of a pixel contacting one or two nodes among the nodes respectively corresponding to the pieces of (N–L)×(N–M) pixel data, the second processing circuit 132 may perform interpolation on the one or two nodes by using linear interpolation or second-order polynomial interpolation. The interpolation method performed by the second processing circuit 132 is described in detail with reference to FIGS. 7A to 10 below.

Reconstructed image data IDATA″ of the second processing circuit 132 may be stored in the memory 133.

When an image is processed by the image processing device 100, according to an embodiment of the present inventive concept, a phase artifact in the first image data IDATA may be removed.

Figure 3A:
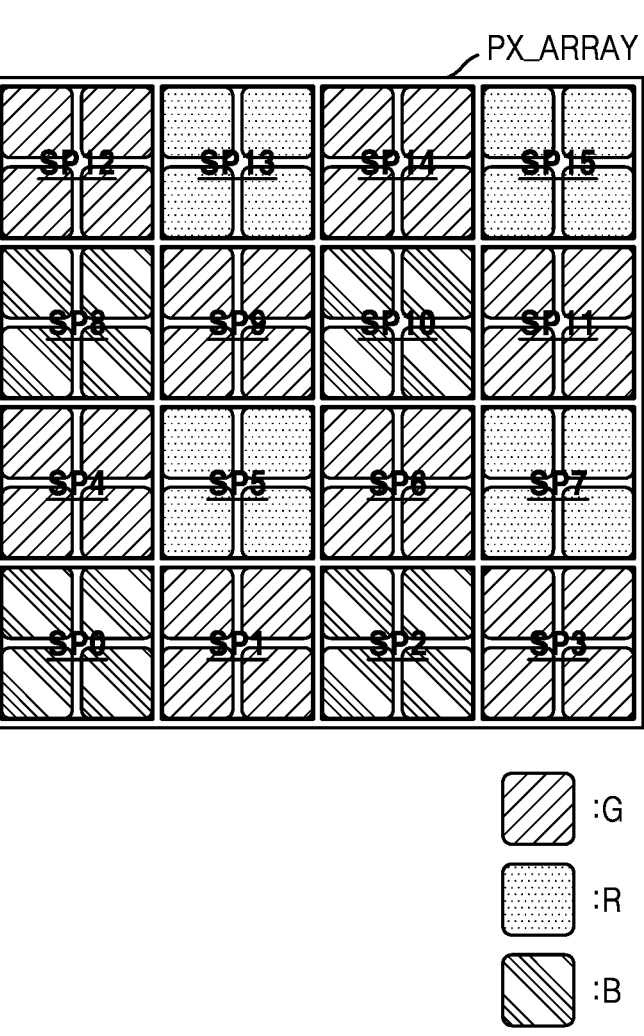
FIGS. 3A, 3B, and 3C are diagrams of pixel arrays according to an embodiment of the present inventive concept.
Figure 3B:
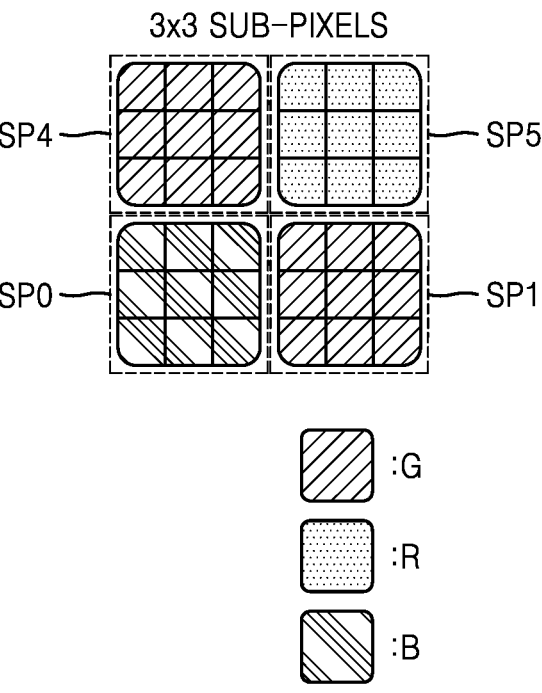
Figure 3C:
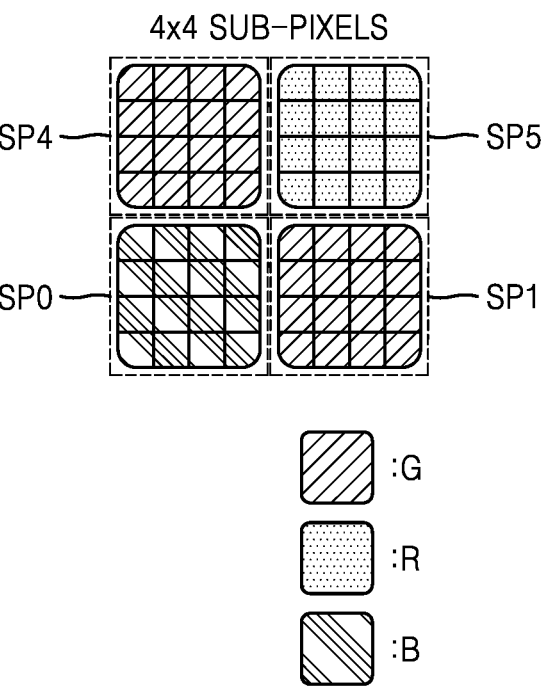

FIGS. 3A to 3C are diagrams illustrating examples of a pixel array corresponding to the CFA 120 in FIG. 2.

Referring to FIG. 3A, a pixel array PX_ARRAY may include a plurality of pixels in a plurality of rows and columns. For example, a shared pixel, which is defined as a unit including pixels in two rows and two columns, may include four sub-pixels. In other words, the shared pixel may include four photodiodes respectively corresponding to four sub-pixels. The pixel array PX_ARRAY may include first to sixteenth shared pixels SP0 to SP15. The pixel array PX_ARRAY may include color filters such that the first to sixteenth shared pixels SP0 to SP15 may sense various colors. For example, the color filters may include a filter sensing a red color R, a filter sensing a green color G, and a filter sensing a blue color B. Each of the first to sixteenth shared pixels SP0 to SP15 may include sub-pixels provided with the same color filter. For example, each of the first shared pixel SP0, the third shared pixel SP2, the ninth shared pixel SP8, and the eleventh shared pixel SP10 may include sub-pixels provided with a blue color filter. Each of the second shared pixel SP1, the fourth shared pixel SP3, the fifth shared pixel SP4, the seventh shared pixel SP6, the tenth shared pixel SP9, the twelfth shared pixel SP11, the thirteenth shared pixel SP12, and the fifteenth shared pixel SP14 may include sub-pixels provided with a green color filter. Each of the sixth shared pixel SP5, the eighth shared pixel SP7, the fourteenth shared pixel SP13, and the sixteenth shared pixel SP15 may include sub-pixels provided with a red color filter. A group including the first shared pixel SP0, the second shared pixel SP1, the fifth shared pixel SP4, and the sixth shared pixel SP5, a group including the third shared pixel SP2, the fourth shared pixel SP3, the seventh shared pixel SP6, and the eighth shared pixel SP7, a group including the ninth shared pixel SP8, the tenth shared pixel SP9, the thirteenth shared pixel SP12, and the fourteenth shared pixel SP13, and a group including the eleventh shared pixel SP10, the twelfth shared pixel SP11, the fifteenth shared pixel SP14, and the sixteenth shared pixel SP15 may each be disposed on the pixel array PX_ARRAY in a Bayer pattern. According to an embodiment of the present inventive concept, the group including the first shared pixel SP0, the second shared pixel SP1, the fifth shared pixel SP4, and the sixth shared pixel SP5, the group including the third shared pixel SP2, the fourth shared pixel SP3, the seventh shared pixel SP6, and the eighth shared pixel SP7, the group including the ninth shared pixel SP8, the tenth shared pixel SP9, the thirteenth shared pixel SP12, and the fourteenth shared pixel SP13, and the group including the eleventh shared pixel SP10, the twelfth shared pixel SP11, the fifteenth shared pixel SP14, and the sixteenth shared pixel SP15 may each correspond to a CFA block.

However, this is just an example, and the pixel array PX_ARRAY may include various kinds of color filters, according to embodiments of the present inventive concept. For example, color filters may include a filter sensing a yellow color, a filter sensing a cyan color, a filter sensing a magenta color, and filter sensing a green color. In addition, color filters may include a filter sensing a red color, a filter sensing a green color, a filter sensing a blue color, and a filter sensing a white color. The pixel array PX_ARRAY may include more shared pixels, and the first to sixteenth shared pixels SP0 to SP15 may be variously arranged.

Referring to FIG. 3B, each of the first shared pixel SP0, the second shared pixel SP1, the fifth shared pixel SP4, and the sixth shared pixel SP5 may include nine sub-pixels. The first shared pixel SP0 may include nine sub-pixels provided with a blue color filter, and each of the second and fifth shared pixels SP1 and SP4 may include nine sub-pixels provided with a green color filter. The sixth shared pixel SP5 may include nine sub-pixels provided with a red color filter. In some embodiments of the present inventive concept, each of the first, second, fifth, and sixth shared pixels SP0, SP1, SP4, and SP5 may be referred to as a nova cell.

Referring to FIG. 3C, each of the first, second, fifth, and sixth shared pixels SP0, SP1, SP4, and SP5 may include sixteen sub-pixels. The first shared pixel SP0 may include sixteen sub-pixels provided with a blue color filter, and each of the second and fifth shared pixels SP1 and SP4 may include sixteen sub-pixels provided with a green color filter. The sixth shared pixel SP5 may include sixteen sub-pixels provided with a red color filter. In some embodiments of the present inventive concept, each of the first, second, fifth, and sixth shared pixels SP0, SP1, SP4, and SP5 may be referred to as a hexadeca cell.

Hereinafter, a shared pixel includes N×N sub-pixels, and a method of processing pixel data of N×N sub-pixels is described.

Figure 4:
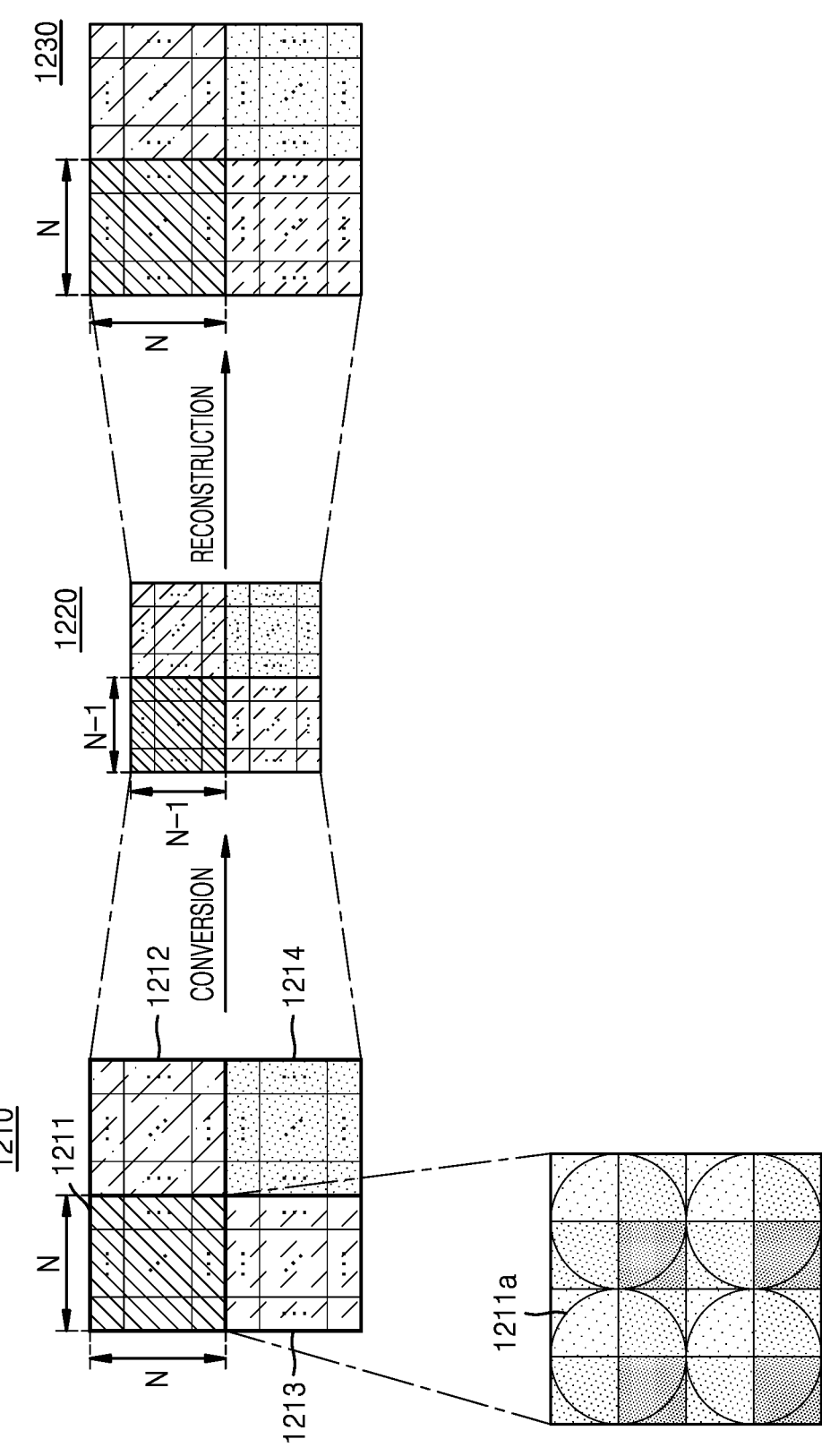
FIG. 4 is a diagram for describing a processing method performed by an image processing device, according to an embodiment of the present inventive concept.

FIG. 4 is a diagram for describing an image data processing method according to an embodiment of the present inventive concept.

FIG. 4 illustrates an example of image data of four shared pixels 1211, 1212, 1213, and 1214 each including N×N sub-pixels.

The first picture in FIG. 4 may refer to first image data 1210 output from a CFA having a Bayer pattern. The second picture in FIG. 4 may refer to second image data 1220, which includes (N–1)×(N–1) sub-pixels generated through conversion of the first image data 1210. The third picture in FIG. 4 may refer to third image data 1230, which includes N×N sub-pixels generated by performing reconstruction on the second image data 1220. The first image data 1210 in FIG. 4 may be referred to as first pixel data 1210. The second image data 1220 in FIG. 4 may be referred to as second pixel data 1220. The third image data 1230 in FIG. 4 may be referred to as third pixel data 1230. The term "pixel data" used herein may refer to image data that includes information corresponding to a pixel and has a form of a pixel array.

FIG. 4 illustrates a method of processing the first pixel data 1220 including N×N sub-pixels. FIG. 4 illustrates an example of converting the first pixel data 1210 including N×N sub-pixels into the second pixel data including (N–1)× (N–1) sub-pixels and reconstructing the third pixel data 1230 including N×N sub-pixels from the second pixel data 1220 including (N−1)×(N−1). According to an embodiment of the present inventive concept, N is a natural number that is greater than or equal to 2.

According to an embodiment of the present inventive concept, a conversion method may include binning. According to an embodiment of the present inventive concept, a microlens 1211a may be disposed on a plurality of sub-pixels included in the shared pixel 1211 as shown in FIG. 4. FIG. 4 illustrates an example, in which four sub-pixels included in the shared pixel 1211 may share one microlens, e.g., the microlens 1211a, with one another. According to the present inventive concept, to reduce a phase difference that occurs when one microlens is shared by several pixels in a CFA block (e.g., the shared pixel 1211, 1212, 1213, or 1214) including the same color pixels, phase information of adjacent sub-pixels may be used. For this operation, an average operation on pixel data values in a 2×2 unit may be performed in a shared pixel including the same color region, with a pixel-by-pixel shift. The average operation is described in detail with reference to FIGS. 5A to 6E.

According to an embodiment of the present inventive concept, the second pixel data 1220 may include (N−1)×(N−1) pieces of pixel data. The second pixel data 1220 may include (N−1)×(N−1) nodes. According to an embodiment of the present inventive concept, the third pixel data 1230 may be reconstructed from the second pixel data 1220 by performing interpolation on the second pixel data 1220. The third pixel data 1230 may be reconstructed using linear interpolation on some of the nodes of the second pixel data 1220 or interpolation using a second-order polynomial of some nodes. This is described in detail with reference to FIGS. 7A to 10.

Referring to FIG. 4, the first pixel data 1210 may include phase information. The second pixel data 1220 resulting from conversion might not include the phase information. The third pixel data 1230 resulting from reconstruction might not include the phase information and may have the same resolution as the first pixel data 1210. In other words, the phase information included in the first pixel data 1210 may be removed during the conversion.

According to an embodiment of the present inventive concept, image data may be processed by a method of down-sampling N×N sub-pixel data to (N−1)×(N−1) sub-pixel data, and then up-sampling the (N−1)×(N−1) sub-pixel data to N×N sub-pixel data. According to an embodiment of the present inventive concept, regardless of the occurrence pattern, i.e., periodicity or aperiodicity, of a phase artifact, data may be converted through down-sampling, with the full use of pixel information of the same color in a spatial domain. In addition, image data with a reduced loss of resolution may be generated through up-sampling.

Although data processing is performed using one-step down-sampling and one-step up-sampling in an embodiment of the present inventive concept, the present inventive concept is not limited thereto. According to an embodiment of the present inventive concept, N×N pixel data may be converted into (N+1)×(N+1) pixel data, and N×N pixel data may be reconstructed from the (N+1)×(N+1) pixel data.

Figure 5A:
FIGS. 5A, 5B, and 5C are diagrams for describing conversion methods performed by an image processing device, according to an embodiment of the present inventive concept.
Figure 5A:
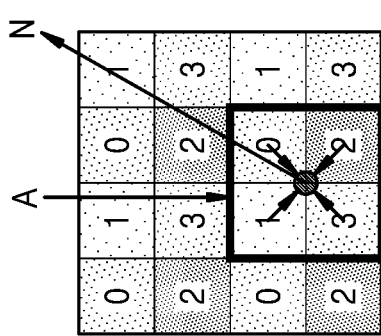
Figure 5A:
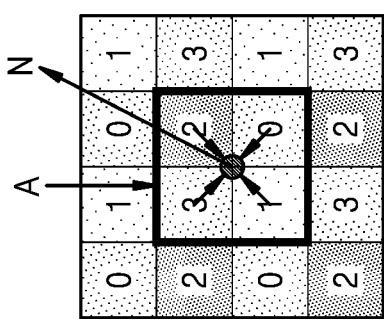
Figure 5A:
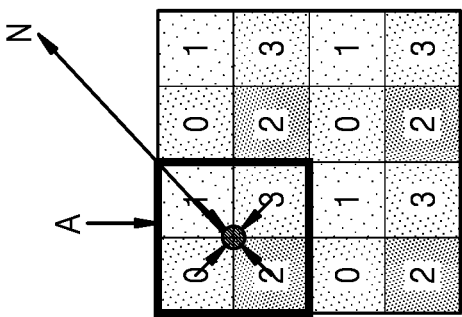
Figure 5A:
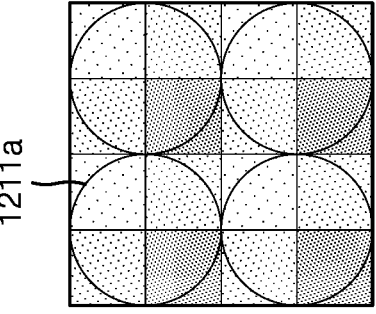
Figure 5B:
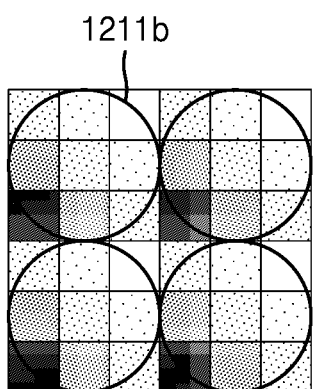
Figure 5B:
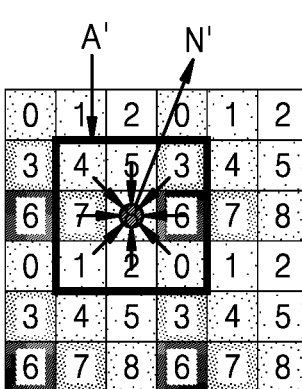
Figure 5C:
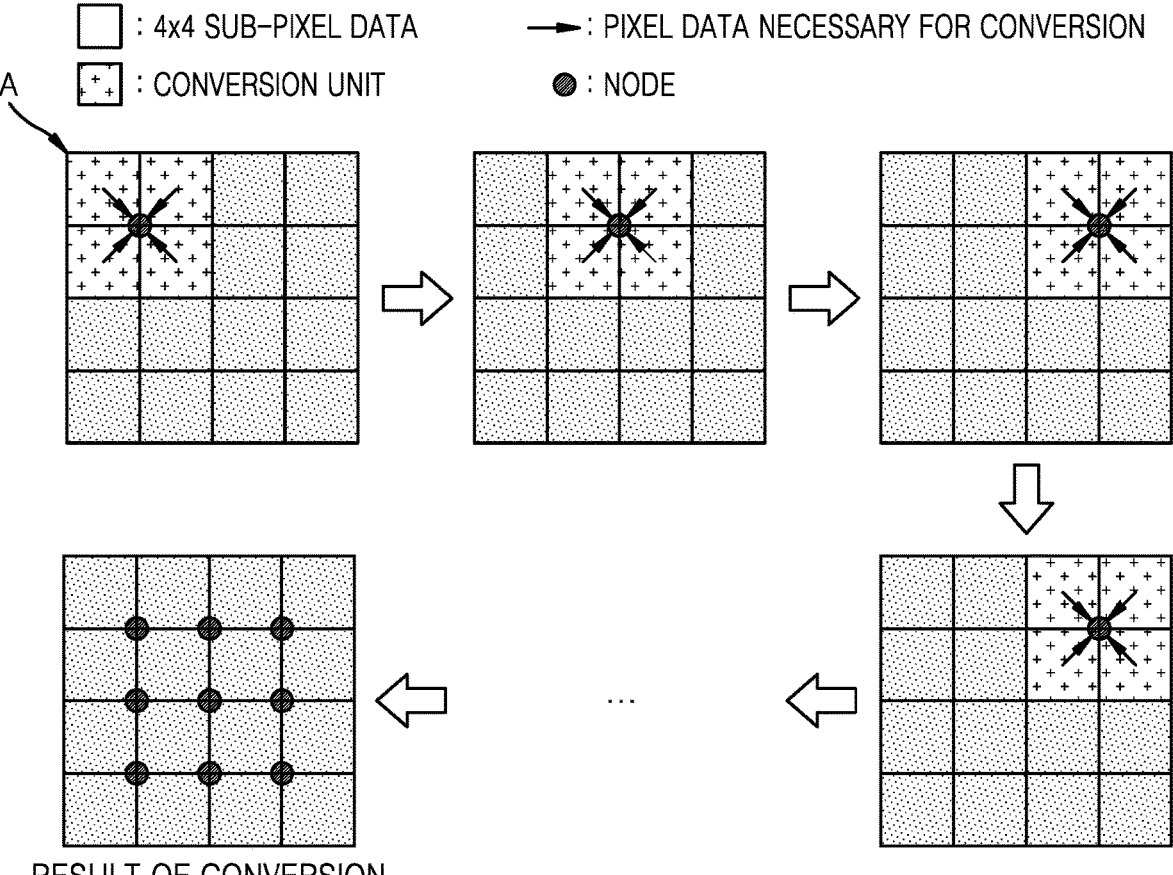

FIGS. 5A to 5C are diagrams for describing conversion methods according to an embodiment of the present inventive concept.

FIG. 5A illustrates an example of converting pixel data including 4×4 sub-pixels into sub-pixel data including 3×3 sub-pixels. The first picture in FIG. 5A may illustrate an example of the pixel data including 4×4 sub-pixels. Referring to the first picture in FIG. 5A, the microlens 1211a may be provided in a region corresponding to 2×2 sub-pixels in 4×4 sub-pixel data. Referring to the first and second pictures in FIG. 5A, a region corresponding to the microlens 1211a in a 2×2 array may be a unit of conversion. According to an embodiment of the present inventive concept, conversion may be performed while a unit of conversion is sequentially shifted across 4×4 sub-pixels. According to an embodiment of the present inventive concept, a conversion method may include binning.

Referring back to FIG. 5A, while sliding an A region corresponding to a microlens in a 2>2 array, a node N may be generated by calculating an average value of data in the A region. According to an embodiment of the present inventive concept, the node N may be generated by calculating an average value of pixels corresponding to a unit region, on which a conversion is performed. The node N generated as a result of the conversion may include average value data of pixels surrounding the node N. The node N may include data information of four adjacent pixels. As a result of the conversion, a 4×4 color pattern may be converted into a 3×3 color pattern, and simultaneously, artifacts caused by a phase difference in each pixel may be removed.

FIG. 5B illustrates an example of converting pixels in a 6×6 array into pixels in a 4×4 array. Referring to FIG. 5B, a region corresponding to a microlens 1211b in a 3×3 array may be a unit of conversion. Referring to FIG. 5B, the unit of conversion may be a microlens in a 3×3 array, differently from FIG. 5A. Referring to FIG. 5B, while sliding an A' region corresponding to the microlens in a 3×3 array, a node N' may be generated by calculating an average value of data in the A' region.

According to an embodiment of the present inventive concept, a unit of conversion may be a region in which a microlens corresponds to a pixel array. In other words, the unit of conversion may vary with the size of a microlens. When the unit of conversion changes, the number of nodes generated through the conversion may also change. For convenience of description, it is assumed that a unit of conversion is a region corresponding to a 2×2 microlens.

FIG. 5C is a diagram for describing an example of converting pixel data including 4×4 sub-pixels. FIG. 5C illustrates a process of forming each of the nodes by sequentially sliding a conversion unit A, which corresponds to a 2×2 microlens as shown in FIG. 5A, across 4×4 sub-pixels. According to an embodiment of the present inventive concept, conversion may be performed by performing binning on all sub-pixels to include information of all sub-pixels.

According to an embodiment of the present inventive concept, information on all phases may be reflected by performing an average operation on pixel values in an I×I unit with respect to sub-pixels in a color region including pixels of the same color. At this time, the I×I unit may correspond to a region occupied by a microlens. The I×I unit may be a conversion unit. "I" may be a natural number that is greater than or equal to 2. Accordingly, the size of an image may be compressed from N×N to (N−L)×(N−M). According to the present embodiment of FIG. 5C, "I" may be equal to 2.

Referring to FIG. 5C, one node may be formed per one conversion unit A in a 2×2 array. According to an embodiment of the present inventive concept, an average value of four sub-pixels corresponding to a conversion unit in a 2×2 array may be set as a node value. Accordingly, when conversion is performed on pixel data including 4×4 sub-pixels by using a 2×2 microlens as a conversion unit, a total of 3×3 pieces of second pixel data may be generated. The second pixel data may include 3×3 nodes. According to an embodiment of the present inventive concept, the term "node" used herein may be interchangeably used with a "binning point".

According to an embodiment of the present inventive concept, converting pixel data in an N×N array into pixel data in an (N−1)×(N−1) array is provided for convenience of description, but the present inventive concept is not limited thereto. In an embodiment of the present inventive concept, pixel data in an N×N array may be converted into pixel data in an (N−2)×(N−2) array. In an embodiment of the present inventive concept, pixel data in an N×N array may be converted into pixel data in an (N−1)×(N−2) array. In an embodiment of the present inventive concept, pixel data in an N×N array may be converted into pixel data in an (N−L)×(N−M) array. At this time, "L" and "M" may each be a natural number that is greater than or equal to 1 and less than "N". "N" may be a natural number that is greater than or equal to 2. Binning may be performed in other various manners than those described above and may be applied to various CFA patterns including those described above.

FIGS. 6A to 6E are diagrams illustrating various examples of second pixel data resulting from conversion.

Figure 6A:
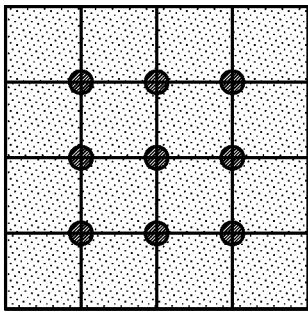
FIGS. 6A, 6B, 6C, 6D, and 6E are diagrams illustrating converting results of an image processing device, according to an embodiment of the present inventive concept.
Figure 6A:
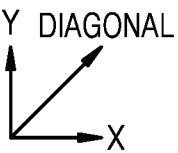

FIG. 6A illustrates an example of a result of performing a binning operation on all available sub-pixels, as shown in FIGS. 5A to 5C. Referring to FIG. 6A, it may be seen that 3×3 nodes are formed as a result of performing a binning operation on 4×4 sub-pixels.

Referring to FIGS. 6B to 6E, a binning operation may be sparsely performed for the efficiency thereof.

Figure 6B:
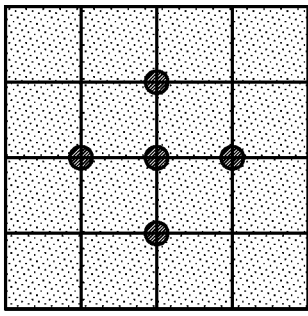
Figure 6B:
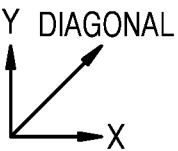

FIG. 6B illustrates an example of a result of performing a binning operation with five binning points being set. According to an embodiment of the present inventive concept with reference to FIG. 6B, the binning operation may be performed to output a node at the center of a grid of 4×4 sub-pixels and to output nodes surrounding the central node in an X-axis direction and a Y-axis direction, which are perpendicular to each other. For example, four nodes may surround the central node; however, the present inventive concept is not limited thereto.

Figure 6C:
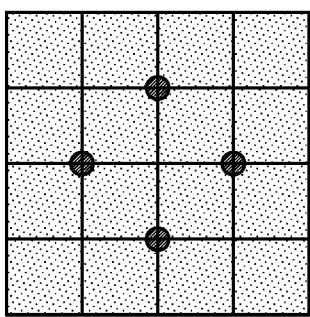
Figure 6C:
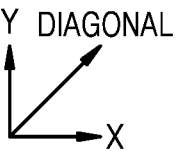

FIG. 6C illustrates an example of a result of performing a binning operation with four binning points being set. According to an embodiment of the present inventive concept with reference to FIG. 6C, the binning operation may be performed to output the nodes in the embodiment of FIG. 6B, except for the central node. For example, the nodes may surround a central area of a grid of 4×4 sub-pixels.

Figure 6D:
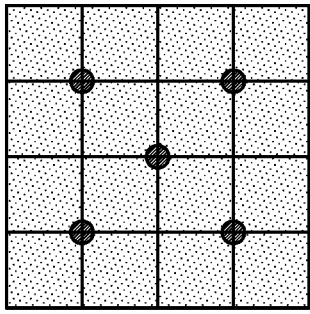
Figure 6D:
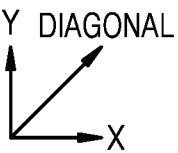

FIG. 6D illustrates an example of a result of performing a binning operation with five binning points being set. According to an embodiment of the present inventive concept with reference to FIG. 6D, the binning operation may be performed to output a node at the center of a grid of 4×4 sub-pixels and output nodes adjacent to the central node in diagonal directions of the central node.

Figure 6E:
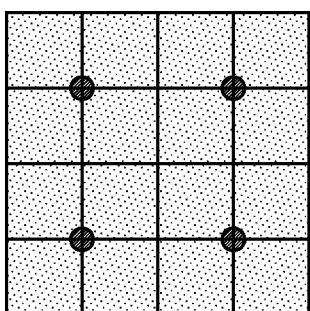
Figure 6E:
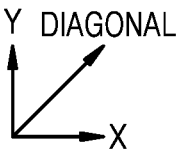

FIG. 6E illustrates an example of a result of performing a binning operation with four binning points being set. According to an embodiment of the present inventive concept with reference to FIG. 6E, the binning operation may be performed to output the nodes in the embodiment of FIG. 6D, except for the central node at the center of a grid of 4×4 sub-pixels. For example, nodes may be output to be adjacent to a central area of the grid of 4×4 sub-pixels in a diagonal direction of the central area. For example, the diagonal direction may be with respect to the X-axis direction and the Y-axis direction, and may cross the X-axis direction and the Y-axis direction.

According to an embodiment of the present inventive concept, the binning methods of FIGS. 6B to 6E may be used when conversion is desired to be performed on some sub-pixels having a large difference from the values of the other sub-pixels.

Hereinafter, a method of reconstructing data is described, based on the assumption that binning is performed on all sub-pixels as shown in FIG. 6A. The interpolation method described below may also be applied to an interpolation method for the case of performing sparse conversion as shown in FIGS. 6B to 6E.

A phase artifact may be removed as a result of binning N×N sub-pixel data into (N−1)×(N−1) sub-pixel data. However, because the size of an image is reduced by converting the N×N sub-pixel data into the (N−1)×(N−1) sub-pixel data, the resolution of the image may decrease. Therefore, the N×N sub-pixel data may be reconstructed from the (N−1)×(N−1) sub-pixel data. The reconstruction method is described in detail with reference to FIGS. 7A to 7C below.

Figure 7A:
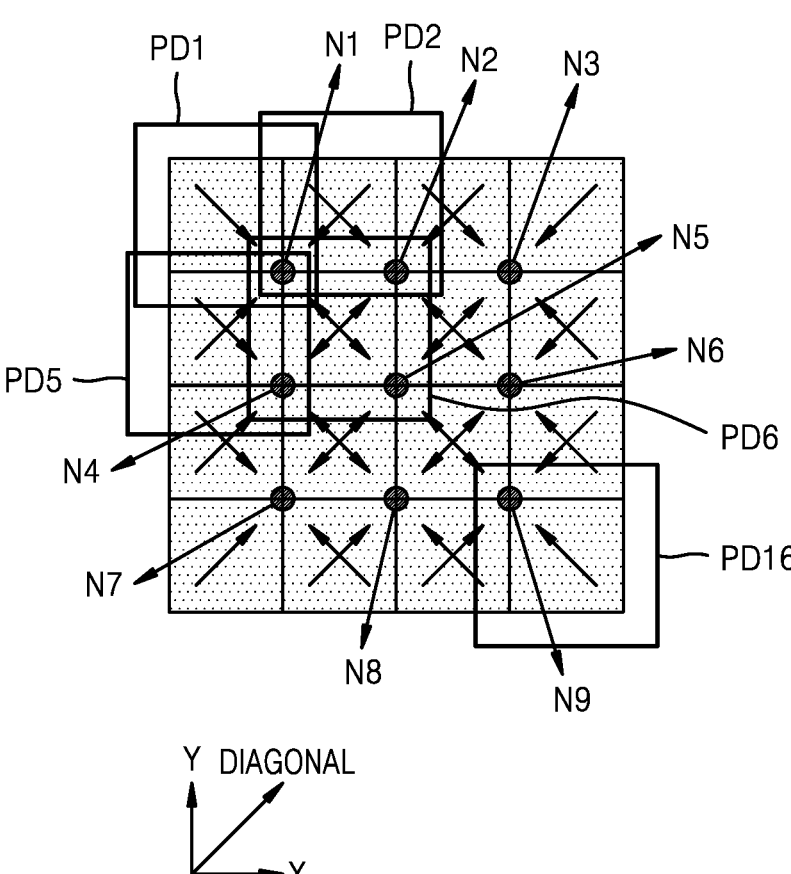
FIG. 7A illustrates nodes resulting from conversion, according to an embodiment of the present inventive concept.
Figure 7B:
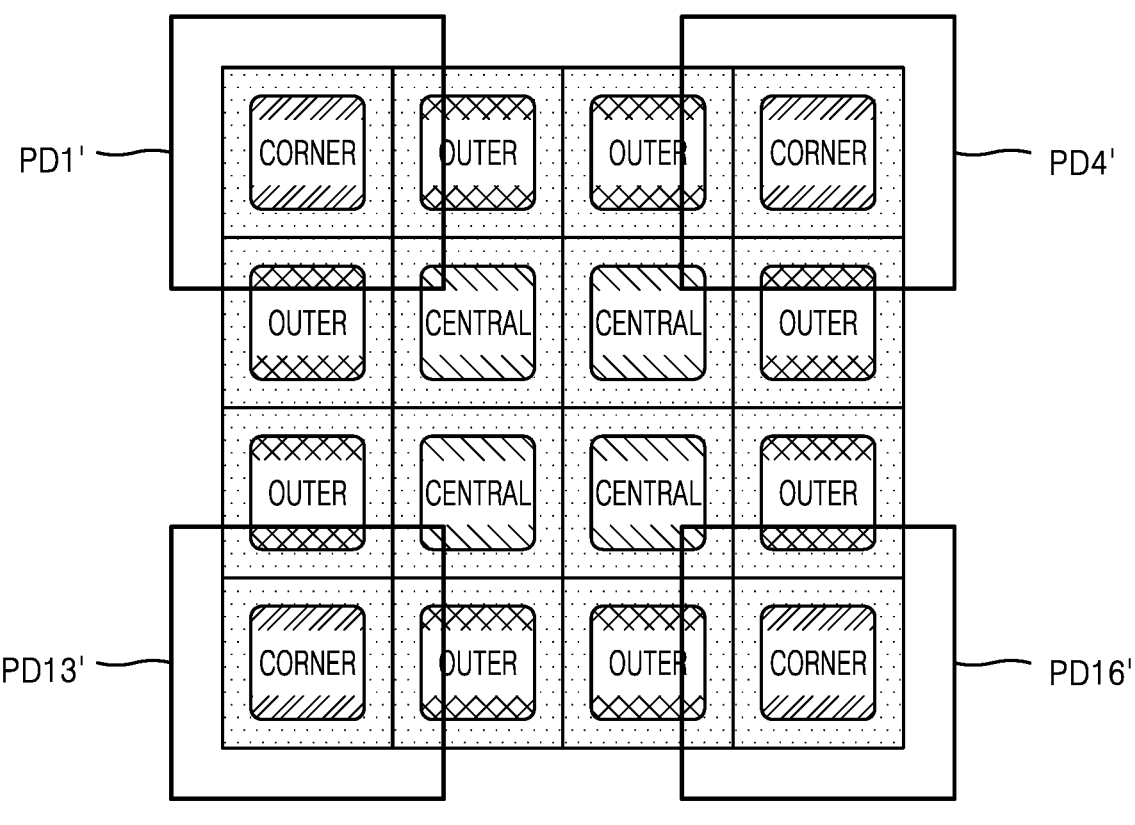
FIG. 7B illustrates reconstructed pixel data according to an embodiment of the present inventive concept.
Figure 7C:
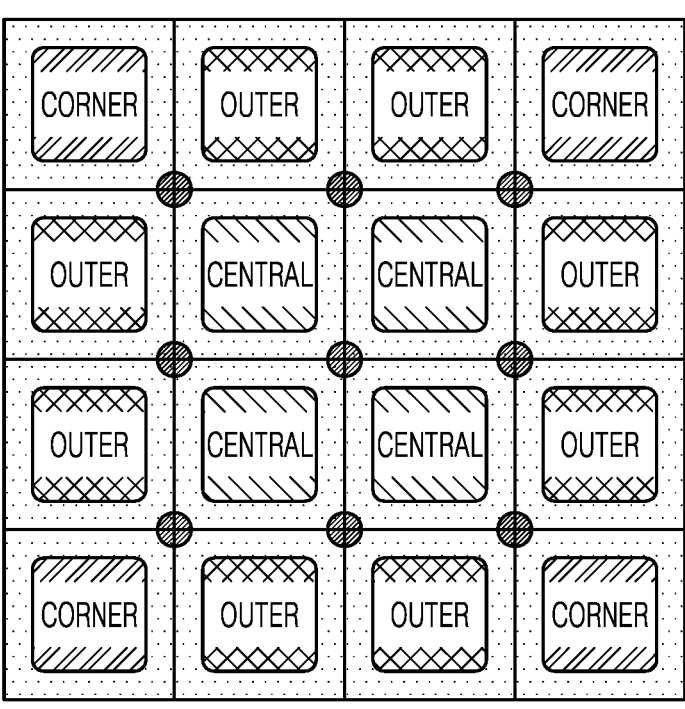
FIG. 7C is a diagram for describing the relationship between FIG. 7A and FIG. 7B.

FIG. 7A illustrates an example of a plurality of nodes generated through conversion. FIG. 7B illustrates an example of final pixel data generated through reconstruction. FIG. 7C is a diagram for describing the relationship between FIG. 7A and FIG. 7B.

FIG. 7A illustrates a plurality of nodes N1 to N9 in a 3×3 array. According to an embodiment of the present inventive concept, each of the nodes N1 to N9 in FIG. 7A may include first pixel data adjacent thereto.

FIG. 7A illustrates 3×3 nodes, i.e., the nodes N1 to N9, resulting from converting 4×4 pieces of sub-pixel data. FIG. 7A illustrates 4×4 pieces of pixel data PD1 to PD16 included in first pixel data together with the nodes N1 to N9 resulting from the conversion on the first pixel data. Referring to FIG. 7A, it may be seen that information of pixels of the first pixel data, which surround each node, is binned into the node. According to an embodiment of the present inventive concept, the node N1 may include the pixel data PD1, PD2, PD5, and PD6.

FIG. 7B illustrates third pixel data, which includes pixel data PD1' to PD16' in a 4×4 array and is reconstructed using the nodes N1 to N9 in FIG. 7A. The third pixel data in a 4×4 array may be divided into three kinds of pixel data. According to an embodiment of the present inventive concept, the third pixel data may include central pixel data, outer pixel data, and corner pixel data. According to an embodiment of the present inventive concept, the outer pixel data and the corner pixel data may be edge pixel data. Referring to FIG. 7B, there may be eight pieces of outer pixel data, four pieces of corner pixel data, and four pieces of central pixel data. According to an embodiment of the present inventive concept, the first pixel data may have the same array as the third pixel data.

FIG. 7C illustrates the relationship between the nodes N1 to N9 resulting from conversion and the pixel data PD1' to PD16' of the third pixel data resulting from reconstruction. According to an embodiment of the present inventive concept, each piece of the central pixel data may be surrounded by four nodes. According to an embodiment of the present inventive concept, each piece of the outer pixel data may be adjacent to two nodes. According to an embodiment of the present inventive concept, each piece of the corner pixel data may be adjacent to one node. The third pixel data resulting from the reconstruction may be divided into the central pixel data, the outer pixel data, and the corner pixel data according to the number of adjacent nodes resulting from binning.

An interpolation method used for each of central pixel data, outer pixel data, and corner pixel data is described in detail below. According to an embodiment of the present inventive concept, the cases of corner pixels, outer pixels, and central pixels are separately described according to the positions thereof in an interpolated 4×4 array when 4×4 information is reconstructed from compressed 3×3 information resulting from a binning operation.

Figure 8:
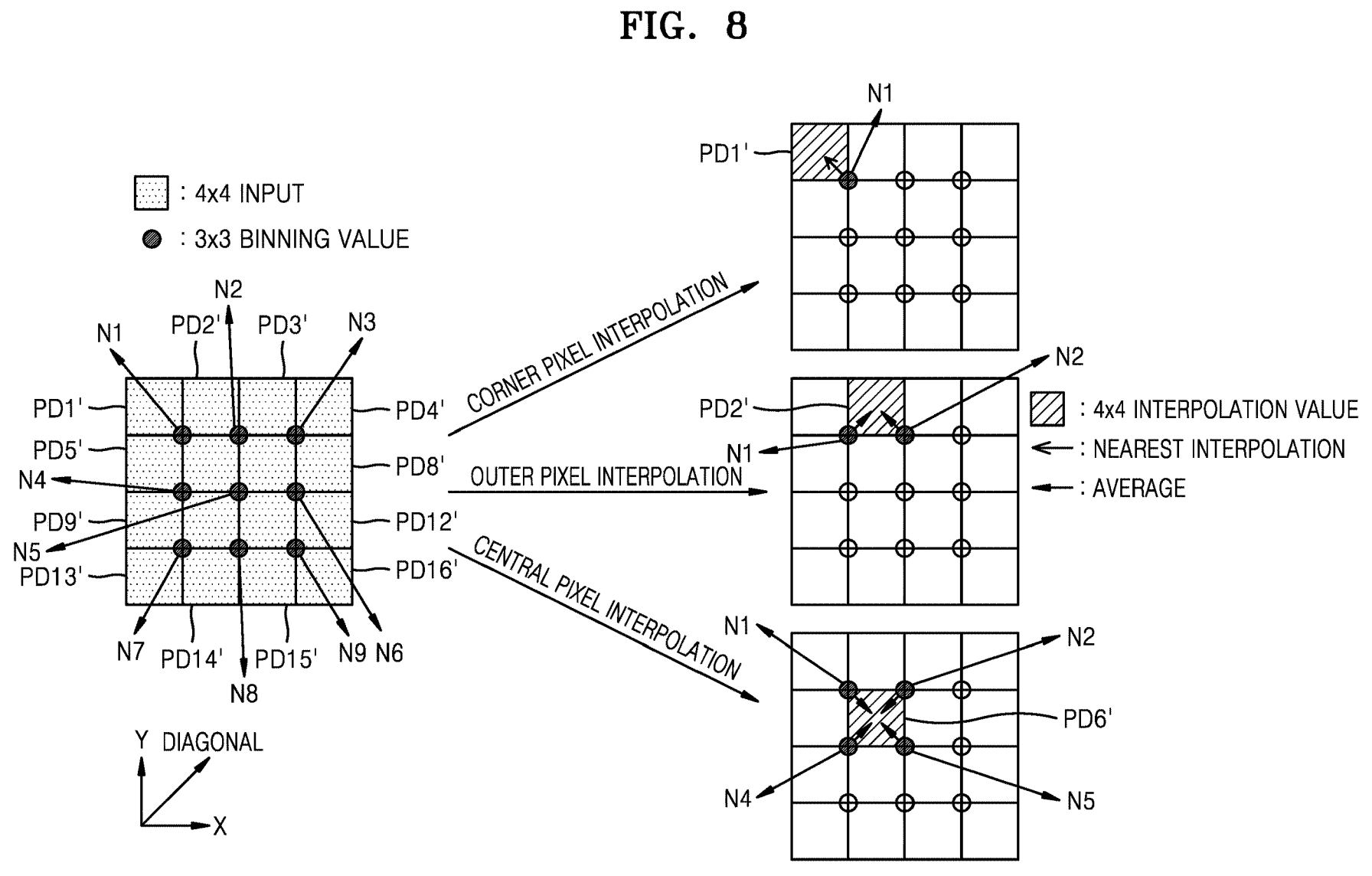

FIG. 8 is a diagram for describing an interpolation method according to an embodiment of the present inventive concept.

Referring to FIG. 8, central pixel data may be reconstructed by bilinear interpolation using four nodes surrounding the central pixel data. This may be given by $$O_{target} = \frac{1}{N}\sum_{i=1}^{N} I_i,$$

where $O_{target}$ may be central pixel data to be reconstructed, N may be the number of nodes for the reconstruction, and "I" may be a data value of the nodes for the reconstruction. Because the values of four nodes surrounding central pixel data reconstruct the central pixel data in FIG. 8, "N" in the equation may be 4.

Referring to FIG. 8, central pixel data PD6' may correspond to an average of data values of the nodes N1, N2, N4, and N5 surrounding the central pixel data PD6'.

Referring to FIG. 8, corner pixel data may correspond to the value of one node adjacent to the coiner pixel data. According to an embodiment, corner pixel data may have a value of a node most adjacent thereto in a diagonal direction, based on nearest interpolation. This may be given by $$O_{target} = I_{input},$$

where $O_{target}$ may be corner pixel data to be reconstructed, and $I_{input}$ may be a data value of one node adjacent to the corner pixel data.

Referring to FIG. 8, corner pixel data PD1' may correspond to the data value of the node N1 nearest to the corner pixel data PD1' in a diagonal direction.

Referring to FIG. 8, outer pixel data may correspond to an average value of two nodes adjacent to the outer pixel data. According to an embodiment of the present inventive concept, outer pixel data may be reconstructed by linear interpolation on two nodes nearest to the outer pixel data. This may be given by $$O_{target} = \frac{1}{N}\sum_{i=1}^{N} I_i,$$

where $O_{target}$ may be outer pixel data to be reconstructed, "N" may be the number of nodes for the reconstruction, and "I" may be a data value of the nodes for the reconstruction. Because the values of two nodes adjacent to outer pixel data reconstruct the outer pixel data in FIG. 8, "N" in the equation may be 2.

Referring to FIG. 8, outer pixel data PD2' may correspond to an average of data values of the nodes N1 and N2 nearest to the outer pixel data PD2'.

Because the number of nodes adjacent to corner pixel data and the number of nodes adjacent to outer pixel data are limited, the corner pixel data and the outer pixel data may be estimated using various interpolation methods.

Figure 9:
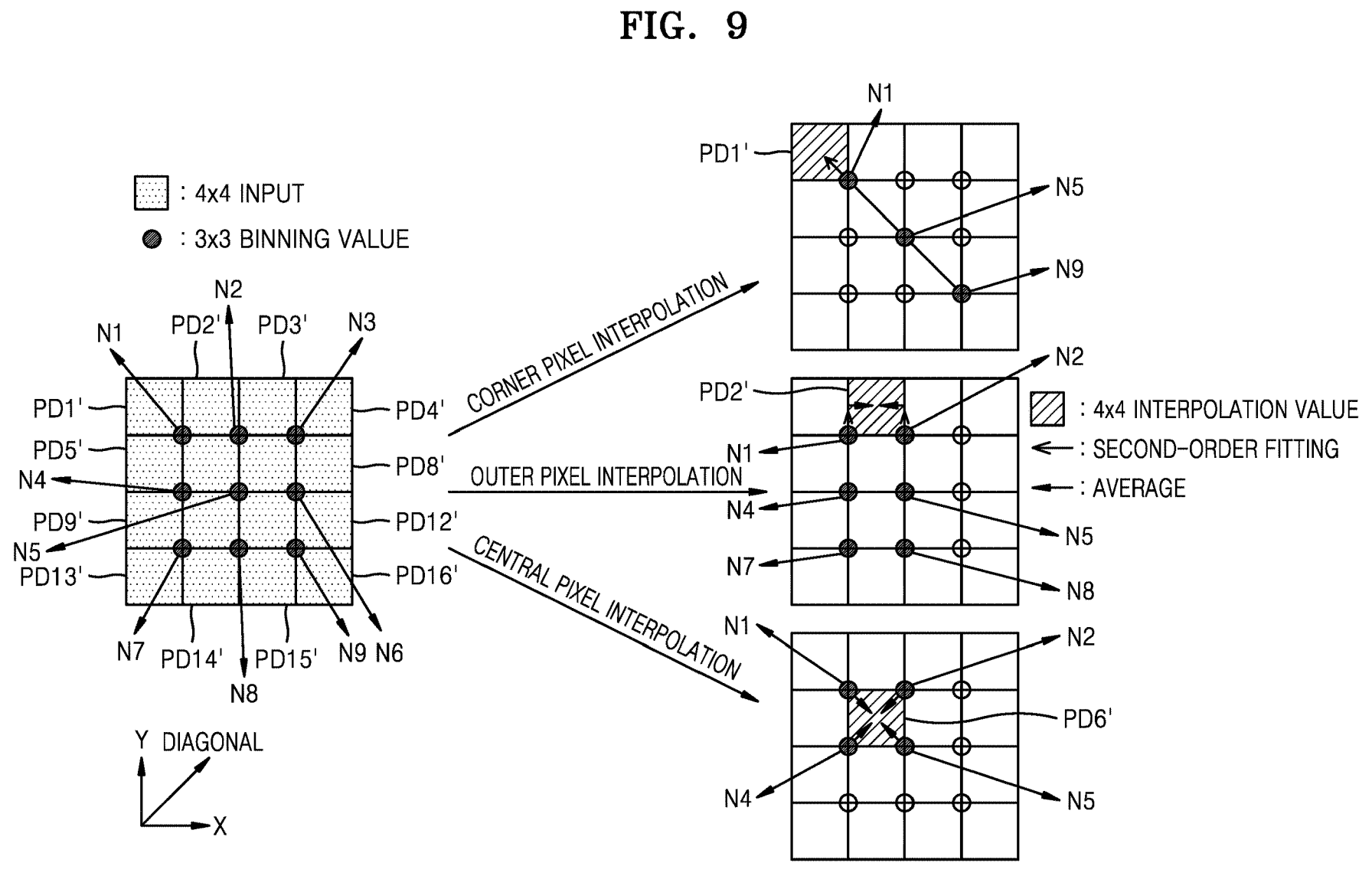

FIG. 9 is a diagram for describing an interpolation method according to an embodiment of the present inventive concept.

Redundant descriptions given above with reference to FIG. 8 may be omitted.

Referring to FIG. 9, corner pixel data may be reconstructed by quadratic interpolation using a second-order polynomial using three nodes nearest to the corner pixel data in a diagonal direction. For example, the three nearest nodes may include the node nearest to the corner pixel data, a central node at the center of a grid of 4×4 sub-pixels, and a node nearest to another corner pixel data opposing the corner pixel data. This may be given by $$O_{target} = A \times I_{input}^2 + B \times I_{input} + C$$
$$\begin{bmatrix} A \\ B \\ C \end{bmatrix} = \left( \begin{bmatrix} x_0^2 & x_0 & 1 \\ x_1^2 & x_1 & 1 \\ x_2^2 & x_2 & 1 \end{bmatrix} \right)^{-1} \begin{bmatrix} y_0 \\ y_1 \\ y_2 \end{bmatrix},$$

where $O_{target}$ may be corner pixel data to be reconstructed, $x_0$, $x_1$, and $x_2$ may each be a position value of a node undergoing interpolation, and $y_0$, $y_1$, and $y_2$ may respectively be input values respectively corresponding to $x_0$, $x_1$, and $x_2$. A, B, and C may be constants determined by the above equation, and $I_{input}$ may be a data value of a node adjacent to the corner pixel data.

Referring to FIG. 9, the corner pixel data PD1' may be estimated using the position values and input values of the nodes N1, N5, and N9 nearest to the corner pixel data PD1' in a diagonal direction.

Referring to FIG. 9, outer pixel data may be reconstructed by averaging pixel values estimated using a second-order polynomial in a horizontal or vertical direction based on a total of six nodes including two nodes nearest to the outer pixel data, wherein the six nodes are nearest to the outer pixel data in the horizontal or vertical direction. This may be given by $$O_{target} = A \times I_{input}^2 + B \times I_{input} + C$$
$$\begin{bmatrix} A \\ B \\ C \end{bmatrix} = \left( \begin{bmatrix} x_0^2 & x_0 & 1 \\ x_1^2 & x_1 & 1 \\ x_2^2 & x_2 & 1 \end{bmatrix} \right)^{-1} \begin{bmatrix} y_0 \\ y_1 \\ y_2 \end{bmatrix}.$$

The same features of the equation as those given above may be omitted. Referring to FIG. 9, the outer pixel data PD2' may be estimated using the two nodes N1 and N2 nearest to the outer pixel data PD2' and the nodes N4, N7, N5, and N8 nearest to the outer pixel data PD2' in the vertical direction. For example, nodes N4 and N5 are closer to the outer pixel data PD2' when compared to nodes N7 and N8.

According to an embodiment of the present inventive concept, the outer pixel data PD2' may be estimated by averaging a result of interpolation using a second-order polynomial of the nodes N1, N4, and N7 nearest to the outer pixel data PD2' in the vertical direction and a result of interpolation using a second-order polynomial of the nodes N2, N5, and N8 nearest to the outer pixel data PD2' in the vertical direction.

Figure 10:
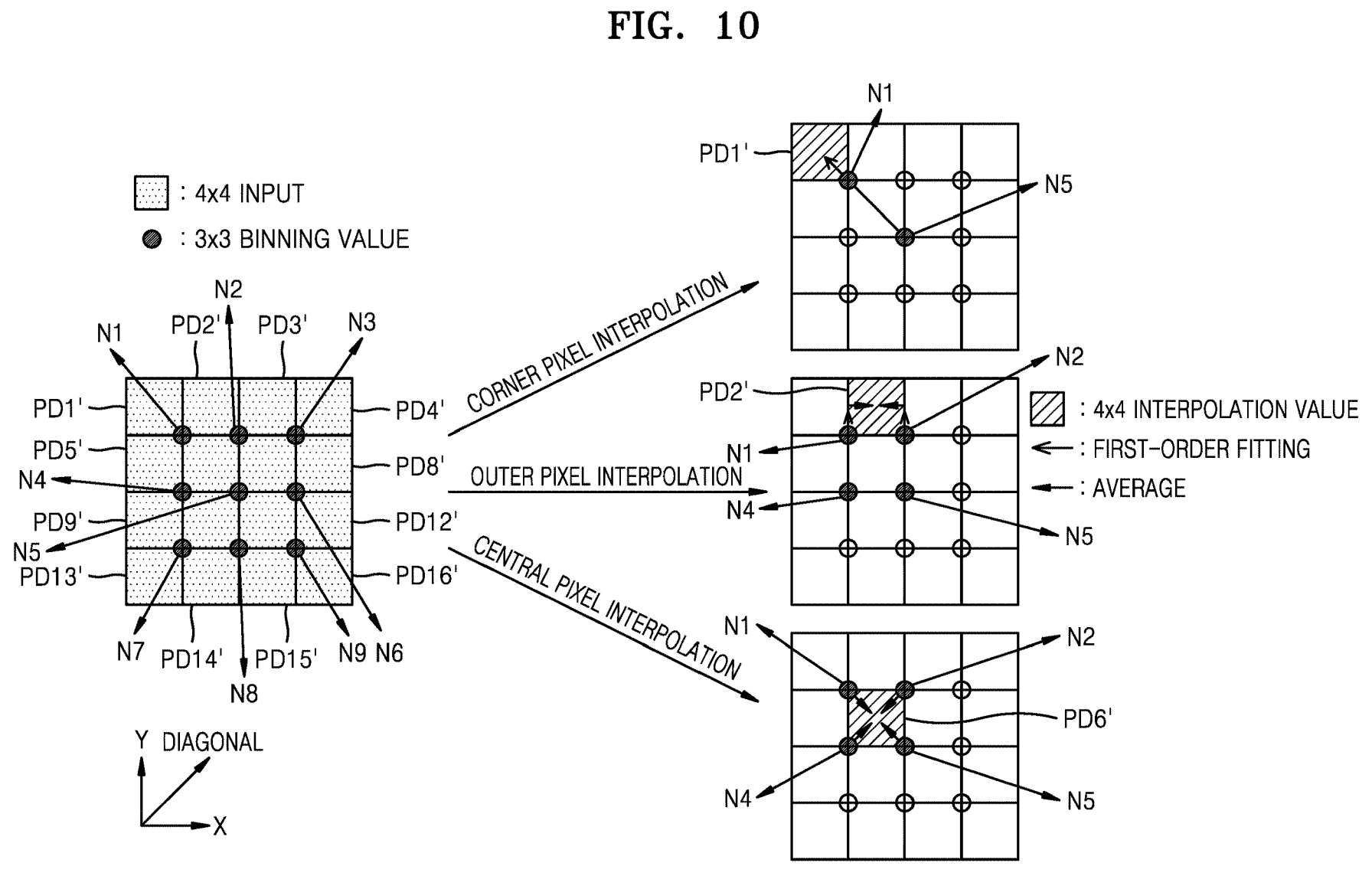

FIG. 10 is a diagram for describing an interpolation method according to an embodiment of the present inventive concept.

Redundant descriptions given above with reference to FIG. 8 may be omitted.

Referring to FIG. 10, corner pixel data may be reconstructed by quadratic interpolation using two nodes nearest to the corner pixel data in a diagonal direction. This may be given by $$O_{target} = D \times I_{input} + E$$

$$\begin{bmatrix} D \\ E \end{bmatrix} = \left( \begin{bmatrix} x_0 & 1 \\ x_1 & 1 \end{bmatrix} \right)^{-1} \begin{bmatrix} y_0 \\ y_1 \end{bmatrix}$$

where $O_{target}$ may be corner pixel data to be reconstructed, $x_0$ and $x_1$ may each be a position value of a node undergoing interpolation, and $y_0$ and $y_1$ may respectively be input values respectively corresponding to $x_0$ and $x_1$. D and E may be constants determined by the above equation, and $I_{input}$ may be a data value of a node adjacent to the corner pixel data.

Referring to FIG. 10, the corner pixel data PD1' may be estimated using the position values and input values of the two nodes N1 and N5 nearest to the corner pixel data PD1' in a diagonal direction.

Referring to FIG. 10, outer pixel data may be reconstructed using a total of four nodes including two nodes nearest to the outer pixel data, wherein the four nodes are nearest to the outer pixel data in the horizontal or vertical direction. This may be given by $$O_{target} = D \times I_{input} + E$$

$$\begin{bmatrix} D \\ E \end{bmatrix} = \left( \begin{bmatrix} x_0 & 1 \\ x_1 & 1 \end{bmatrix} \right)^{-1} \begin{bmatrix} y_0 \\ y_1 \end{bmatrix}$$

The same features of the equation as those given above may be omitted. Referring to FIG. 10, the outer pixel data PD2' may be estimated using the two nodes N1 and N2 nearest to the outer pixel data PD2' and the nodes N4 and N5 nearest to the outer pixel data PD2' in the vertical direction. For example, nodes N1 and N2 are closer to the outer pixel data PD2' when compared to nodes N4 and N5.

According to an embodiment of the present inventive concept, the outer pixel data PD2' may be estimated by averaging a result of performing linear interpolation on the nodes N1 and N4 nearest to the outer pixel data PD2' in the vertical direction and a result of performing linear interpolation on the nodes N2 and N5 nearest to the outer pixel data PD2' in the vertical direction.

According to an embodiment of the present inventive concept, when the interpolation methods described with reference to FIGS. 9 and 10 are used, a loss of pixel information may be reduced. For example, besides the binning and interpolation methods described above, various binning methods, e.g., weighted averaging and median-based binning, used in the fields of image processing and image analysis may be used, and various interpolation methods, e.g., n-th order curve fitting and multivariate interpolation, may be used. The binning and interpolation methods described above may be applied to various CFA patterns. The interpolation methods according to an embodiment of the present inventive concept are not limited to the equations described with reference to FIGS. 8 to 10.

Embodiments of the present inventive concept with reference to FIGS. 8 to 10 may use the same interpolation method for central pixel data. Embodiments of the present inventive concept with reference to FIGS. 8 to 10 may use different interpolation methods for corner pixel data and outer pixel data from one another. The interpolation method for corner pixel data and the interpolation method for outer pixel data, which are described with reference to each of FIGS. 8 to 10, may be examples. During reconstruction from second pixel data, the interpolation method according to an embodiment of the present inventive concept with reference to FIG. 8 may be used for corner pixel data, and the interpolation method according to an embodiment of the present inventive concept with reference to FIG. 9 may be used for outer pixel data.

Although the embodiments of reconstructing N×N pixel data from (N−1)×(N−1) pixel data have been described, the present inventive concept is not limited thereto. According to an embodiment of the present inventive concept, N×N pixel data may be reconstructed from (N−2)×(N−2) pixel data by using the interpolation methods described above. According to an embodiment of the present inventive concept, N×N pixel data may be reconstructed from (N−1)× (N−2) pixel data.

Figure 11A:
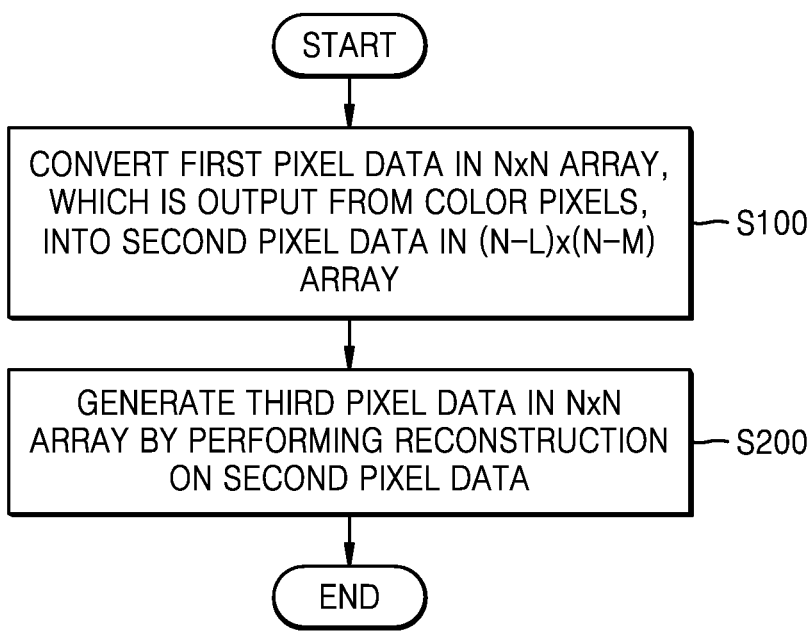

FIGS. 11A and 11B are flowcharts of an image data processing method according to an embodiment of the present inventive concept.

FIG. 11A is a flowchart of a method of processing image data output from a CFA including N×N same color pixels.

First pixel data in an N×N array, which is output from color pixels, may be converted into second pixel data in an (N−L)×(N−M) array in operation S100, and third pixel data in the N×N array may be generated by performing reconstruction on the second pixel data in operation S200.

FIG. 11B is a detailed flowchart of the image data processing method of FIG. 11A.

The second pixel data may be obtained by forming (N−L)×(N−M) nodes by performing a binning operation on the first pixel data in operation S110.

A piece of third pixel data may be generated by interpolating at least one of the (N−L)×(N−M) nodes in operation S210.

According to an embodiment of the present inventive concept, the third pixel data in the N×N array may include at least one piece of central pixel data and a plurality of pieces of edge pixel data surrounding the central pixel data. The edge pixel data may include outer pixel data adjacent to the central pixel data in the X-axis direction or the Y-axis direction and/or corner pixel data adjacent to the central pixel data in a diagonal direction. According to the present embodiment, the X-axis direction may correspond to a row direction, and the Y-axis direction may correspond to a column direction.

The central pixel data may be generated by interpolating four nodes surrounding the central pixel data in operation S310.

The outer pixel data may be generated by interpolating two nodes adjacent to the outer pixel data in operation S320. Alternatively, the outer pixel data may be generated by performing linear interpolation or interpolation using a second-order polynomial on two nodes adjacent to the outer pixel data and additional nodes in the same columns or row as the two nodes in operation S320.

The corner pixel data may be generated by obtaining a value of one node adjacent to the corner pixel data in operation S330. Alternatively, the corner pixel data may be generated by performing linear interpolation or interpolation using a second-order polynomial on one node adjacent to the corner pixel data and additional nodes in a diagonal direction in operation S330.

When the image data processing method according to an embodiment of the present inventive concept is used, phase artifacts occurring periodically or aperiodically may be removed. When a remosaic algorithm converting a non-Bayer pattern into a Bayer pattern is used without using the image data processing method according to an embodiment of the present inventive concept, artifacts may be emphasized as a certain pattern.

However, when the image data processing method according to an embodiment of the present inventive concept is used, pattern noise may be removed. Because adjacent pixel information is not used in a frequency domain but is used in a spatial domain in the image data processing method according to an embodiment of the present inventive concept, the image data processing method may be used, regardless of external factors, such as heat and color temperature, or intrinsic characteristics of various CFA patterns and sensor modules, and separate calibration might not be necessary.

While the present inventive concept has been described with reference to embodiments thereof, it will be understood by those of ordinary skill in the art that various changes in form and details may be made thereto without departing from the spirit and scope of the present inventive concept.

What is claimed is:

1. A method of processing image data, the method comprising:
   receiving image data from a color filter array including pixels in an N×N array, wherein all the pixels in the N×N array are of a same color and output a first pixel data in the N×N array;
   converting the first pixel data in the N×N array into second pixel data in an (N−L)×(N−M) array; and
   generating third pixel data in the N×N array corresponding to the pixels in the N×N array by performing reconstruction on the second pixel data,
   wherein each of "L" and "M" is a natural number that is greater than or equal to 1 and less than N,
   "N" is a natural number that is greater than or equal to 2, and
   the converting of the first pixel data into the second pixel data includes forming (N−L)×(N−M) nodes through binning using a conversion unit, and a size of the conversion unit corresponds to a region size of a set of the pixels in the N×N array covered by a microlens.

2. The method of claim 1, wherein
   each respective node of the (N−L)×(N−M) nodes includes data information of a corresponding set of the pixels of the first pixel data, wherein each respective node of the (N−L)×(N−M) nodes is adjacent to the corresponding set of the pixels.

3. The method of claim 2, wherein the generating of the third pixel data includes generating a piece of the third pixel data by interpolating at least two nodes among the (N−L)×(N−M) nodes.

4. The method of claim 3, wherein the third pixel data in the N×N array includes at least one piece of central pixel data and a plurality of pieces of edge pixel data surrounding the at least one piece of central pixel data.

5. The method of claim 4, wherein the at least one piece of central pixel data is generated by interpolating four nodes surrounding the at least one piece of central pixel data.

6. The method of claim 4, wherein the plurality of pieces of edge pixel data include:
   a plurality of pieces of outer pixel data adjacent to the at least one piece of central pixel data in an X-axis direction or a Y-axis direction, which are perpendicular to each other; and a plurality of pieces of corner pixel data adjacent to the at least one piece of central pixel data in a diagonal direction with respect to the X-axis direction and the Y-axis direction.

7. The method of claim 6, wherein each of the plurality of pieces of outer pixel data is generated by interpolating two nodes adjacent thereto.

8. The method of claim 6, wherein each of the plurality of pieces of outer pixel data is generated by performing linear interpolation or interpolation using a second-order polynomial on two nodes adjacent thereto and additional nodes in same columns or rows as the two nodes.

9. The method of claim 6, wherein each of the plurality of pieces of corner pixel data is generated by performing linear interpolation or interpolation using a second-order polynomial on one node adjacent thereto and additional nodes in a diagonal direction with respect to the X-axis direction and the Y-axis direction.

10. A method of processing image data, the method comprising:
   receiving image data output from a color filter array (CFA) including a plurality of CFA blocks including at least one color region including pixels in a first array, wherein all the pixels in the first array are of a same color and output a first pixel data in the first array;
   generating second pixel data in a second array by converting the first pixel data in the first array; and
   generating third pixel data in the first array corresponding to the pixels in the first array by performing reconstruction on the second pixel data in the second array,
   wherein the generating of the second pixel data includes forming a plurality of nodes including information about the pixels in the first array through binning using a conversion unit, and a size of the conversion unit corresponds to a region size of a set of the pixels in the first array covered by a microlens.

11. The method of claim 10, wherein the forming of the plurality of nodes includes setting a conversion unit and performing binning with a center of the conversion unit being set as each of the plurality of nodes.

12. The method of claim 11, wherein each of the plurality of nodes corresponds to a contact point between a plurality of pieces of pixel data included in the third pixel data.

13. The method of claim 12, wherein the third pixel data includes:
   central pixel data surrounded by four nodes among the plurality of nodes;
   outer pixel data in contact with two nodes among the plurality of nodes; and
   corner pixel data in contact with one node among the plurality of nodes.

14. The method of claim 13, wherein the central pixel data is generated by interpolating the four nodes surrounding the central pixel data.

15. The method of claim 13, wherein the outer pixel data is generated by interpolation using an average value of the two nodes adjacent to the outer pixel data or generated by performing linear interpolation or interpolation using a second-order polynomial on the two nodes adjacent to the outer pixel data and additional nodes in same columns or rows as the two nodes.

16. The method of claim 13, wherein the corner pixel data is generated by obtaining a value of the one node adjacent to the corner pixel data or by performing linear interpolation or interpolation using a second-order polynomial on the one node adjacent to the corner pixel data and additional nodes in a diagonal direction with respect to an X-axis direction and a Y-axis direction, which are perpendicular to each other.

17. The method of claim 10, wherein a method of performing the reconstruction on the second pixel data varies with a number of nodes contacting a piece of pixel data included in the third pixel data.

18. An image processing processor for processing image data output from an image sensor, the image processing processor comprising:

a first processing circuit configured to perform conversion of the image data received from the image sensor, wherein the image sensor includes pixels in an N×N array, and all the pixels in the N×N array are of a same color, and the image data includes a first pixel data in the N×N array from the pixels in the N×N array; and a second processing circuit configured to perform reconstruction on converted data, wherein the first processing circuit is configured to perform the conversion by binning the first pixel data in the N×N array into a second pixel data in an (N−L)× (N−M) array through binning using a conversion unit, and a size of the conversion unit corresponds to a region size of a set of the pixels in the N×N array covered by a microlens, where each of "L" and "M" is a natural number that is greater than or equal to 1 and less than "N", "N" is a natural number that is greater than or equal to 2, and the second processing circuit is configured to perform the reconstruction corresponding to the pixels in the N×N array by interpolating nodes corresponding to the second pixel data in the (N−L)×(N−M) array.

19. The image processing processor of claim 18, wherein the second processing circuit is configured to reconstruct pixel data surrounded by four nodes among the nodes corresponding to the pixel data in the (N−L)×(N−M) array by performing interpolation using an average value of the four nodes.

20. The image processing processor of claim 18, wherein the second processing circuit is configured to reconstruct pixel data contacting one or two nodes among the nodes corresponding to the pixel data in the (N−L)×(N−M) array by performing linear interpolation or interpolation using a second-order polynomial on the one or two nodes.

\* \* \* \* \*